(12) United States Patent
Nishino

(10) Patent No.: US 7,710,751 B2
(45) Date of Patent: May 4, 2010

(54) SECONDARY-SIDE POWER RECEIVING CIRCUIT OF NONCONTACT POWER SUPPLYING EQUIPMENT

(75) Inventor: Shuzo Nishino, Osaka (JP)

(73) Assignee: Daifuku Co., Ltd., Osaka (JP)

( * ) Notice: Subject to any disclaimer, the term of this patent is extended or adjusted under 35 U.S.C. 154(b) by 260 days.

(21) Appl. No.: 11/918,802

(22) PCT Filed: Apr. 21, 2006

(86) PCT No.: PCT/JP2006/308410

§ 371 (c)(1),
(2), (4) Date: Oct. 18, 2007

(87) PCT Pub. No.: WO2006/115196

PCT Pub. Date: Nov. 2, 2006

(65) Prior Publication Data

US 2009/0067207 A1    Mar. 12, 2009

(30) Foreign Application Priority Data

Apr. 22, 2005    (JP)    ............... 2005-124351

(51) Int. Cl.
*H02M 7/00*    (2006.01)
*H02M 7/06*    (2006.01)

(52) U.S. Cl. .................. 363/67; 363/68; 363/125; 363/126

(58) Field of Classification Search .......... 363/67, 363/68, 125, 126
See application file for complete search history.

(56) References Cited

U.S. PATENT DOCUMENTS 4,020,411 A * 4/1977 Tsuboi et al. ............. 363/68
4,030,018 A * 6/1977 Tsuboi ..................... 363/68
4,144,559 A * 3/1979 Okumura et al. .......... 363/88
4,545,005 A * 10/1985 Mudde .................... 363/68
4,947,126 A * 8/1990 May et al. ............... 324/509
5,105,351 A * 4/1992 Harada et al. ............ 363/65

(Continued)

FOREIGN PATENT DOCUMENTS

JP    2005-027401    1/2005

(Continued)

OTHER PUBLICATIONS

International Search Report for International App. No. PCT/JP2006/308410, May 23, 2006.

*Primary Examiner*—Bao Q Vu
(74) *Attorney, Agent, or Firm*—Kusner & Jaffe

(57) ABSTRACT

A plurality of pickup coils 2A and 2B are provided, resonance capacitors 3A and 3B forming resonance circuits 4A and 4B resonating at the frequency of an inductive path 1 are respectively connected in series with the pickup coils 2A and 2B, and the resonance circuits 4A and 4B are connected in series. Further, the resonance circuits 4A and 4B are respectively provided with rectifier circuits 6A and 6B for rectifying voltages generated by the resonance circuits 4A and 4B. The rectifier circuits 6A and 6B are connected in parallel and feed power to a load 10. Moreover, a switch 5 is provided to switch a connected state and an open state between the resonance circuits 4A and 4B, and a voltage controller 11 is provided to control an output voltage applied to the load 10, by controlling the switch 5.

5 Claims, 7 Drawing Sheets

U.S. PATENT DOCUMENTS

| | | | |
|---|---|---|---|
| 5,272,612 A * | 12/1993 | Harada et al. | 363/8 |
| 5,345,231 A * | 9/1994 | Koo et al. | 340/870.31 |
| 5,687,071 A * | 11/1997 | Debruyne et al. | 363/127 |
| 5,698,838 A | 12/1997 | Yamaguchi | 235/492 |
| 5,731,968 A * | 3/1998 | Van Der Broeck et al. | 363/71 |
| 5,991,178 A * | 11/1999 | Arnould | 363/68 |
| 6,031,745 A * | 2/2000 | Southman et al. | 363/70 |
| 7,009,853 B2 * | 3/2006 | Nagel et al. | 363/17 |
| 7,092,268 B2 * | 8/2006 | George | 363/126 |
| 2002/0149954 A1 * | 10/2002 | Besnier et al. | 363/123 |

FOREIGN PATENT DOCUMENTS

| | | |
|---|---|---|
| WO | WO01/18936 | 3/2001 |
| WO | WO01/031557 | 5/2001 |
| WO | WO2004/019055 | 3/2004 |

* cited by examiner

SECONDARY-SIDE POWER RECEIVING CIRCUIT OF NONCONTACT POWER SUPPLYING EQUIPMENT

FIELD OF INVENTION

The present invention relates to a secondary-side power receiving circuit of noncontact power supplying equipment.

BACKGROUND OF THE INVENTION

An example of a secondary-side power receiving circuit of conventional noncontact power supplying equipment is disclosed in, for example, Japanese Patent Laid-Open No. 11-178104.

In the secondary-side power receiving circuit of the noncontact power supplying equipment, a capacitor forming, with a pickup coil, a resonance circuit resonating at the frequency of an inductive path is connected in parallel with the pickup coil, a rectifying/smoothing circuit is connected to the capacitor, a constant voltage control circuit for controlling an output voltage to a reference voltage is connected to the rectifying/smoothing circuit, and an inverter and a control power supply are connected to the constant voltage control circuit as an example of a load. An electric motor including a speed reducer is connected to the inverter.

The constant voltage control circuit is made up of a coil for limiting a current, a voltage generator for generating the reference voltage, a comparator for comparing the output voltage and the reference voltage, an output adjusting transistor including a FET which is connected between the output ends of the rectifying/smoothing circuit and is turned on by the comparator when the output voltage exceeds the reference voltage, and a diode and a capacitor which form a filter. The control power supply supplies control power to the voltage generator and the comparator.

With the configuration of the constant voltage control circuit, when a load decreases due to the stop and so on of the electric motor, the output voltage increases. When the output voltage exceeds the reference voltage, the output adjusting transistor is turned on by the comparator, and the output voltage is reduced and kept at the reference voltage.

However, according to the conventional configuration, when the load decreases due to the stop and so on of the electric motor, the output adjusting transistor is turned on and thus current passes through the output adjusting transistor even though power supply to the load is unnecessary, resulting in a loss.

SUMMARY OF THE INVENTION

An object of the present invention is to provide a secondary-side power receiving circuit of noncontact power supplying equipment which can reduce a loss when power supply to a load is unnecessary.

In order to attain the object, a secondary-side power receiving circuit of noncontact power supplying equipment according to claim 1 of the present invention includes a plurality of pickup coils which are opposed to a primary-side inductive path for passing a high-frequency current and are fed with an electromotive force induced by the inductive path, resonance circuits including resonance capacitors respectively connected in series with the pickup coils and resonating at the frequency of the inductive path, the resonance circuits being connected in series, the resonance circuits respectively including rectifier circuits rectifying voltages generated by the resonance circuits, the rectifier circuits being connected in parallel to supply power to a load having varying power consumption, a switching unit for switching a connected state and an open state between the resonance circuits, and a voltage control unit for controlling an output voltage applied to the load, by controlling the switching unit, wherein the switching unit includes a transformer having a primary-side winding connected in series between the resonance circuits, a rectifier having an input end connected to the secondary-side winding of the transformer, and a switching device connected between the output ends of the rectifier, and the voltage control unit controls the output voltage applied to the load, by opening and closing the switching device of the switching unit.

According to the configuration, when the high-frequency current is supplied to the inductive path, a magnetic flux generated on the inductive path causes an induced electromotive force on the pickup coils, and the induced electromotive force generated on the pickup coils is rectified as a predetermined voltage in the rectifier circuits and is supplied to the load. When the load is under normal load conditions, the switching device of the switching unit is turned on to connect the resonance circuits with each other in series between the resonance circuits, and the sum of voltages generated in the rectifier circuits of the resonance circuits is supplied to the load. When the load is under light load conditions, the output voltage increases, the switching device of the switching unit selected by the voltage control unit according to the state of the load is turned off, the selected switching unit isolates the resonance circuits, and voltages generated by the rectifier circuits of the resonance circuits other than isolated resonance circuits are supplied to the load.

According to an invention of claim 3, in the invention of claim 1, the primary-side winding and the secondary-side winding of the transformer have a turns ratio of 1:1 and the primary-side winding of the transformer has an impedance higher than the resistance of the load under light load conditions.

According to this configuration, the switching device is turned off (opened) when the load is under light load conditions. At this moment, when a voltage generated on the secondary-side winding of the transformer is smaller than the output voltage applied to the load, current does not pass through the secondary-side winding of the transformer. Therefore, the secondary-side winding of the transformer is completely opened and the primary-side winding of the transformer has a high impedance. At this moment, a voltage induced by each pickup coil is applied to the primary-side winding of the transformer having a high impedance, a small current passes through the primary-side winding of the transformer, and the current passes through the load via the rectifier. When the resistance of the load under light load conditions is lower than the high impedance of the primary-side winding, the discharging current is larger than the charging current and thus the output voltage decreases.

An invention of claim 4 includes pickup coils which are opposed to a primary-side inductive path for passing a high-frequency current and are fed with an electromotive force induced by the inductive path, resonance circuits including resonance capacitors connected in series with the pickup coils and resonating at the frequency of the inductive path, a rectifier circuit for rectifying a voltage generated by the resonance circuits and feeding power to a load having varying power consumption, two output capacitors connected in series with an equal capacitance and connected between the output ends of the rectifier circuit, a switching unit for switching a connected state and an open state between the junction of the two output capacitors and one end of the resonance circuits, and a voltage control unit for controlling an output voltage applied to the load, by controlling the switching unit. The switching unit includes a transformer having a primary-side winding connected in series between the junction of the two output capacitors and one end of the resonance circuits, a rectifier having an input end connected to the secondary-side winding of the transformer, and a switching device connected between the output ends of the rectifier, and the voltage control unit controls the output voltage applied to the load, by opening and closing the switching device of the switching unit.

According to the configuration, when the high-frequency current is supplied to the inductive path, a magnetic flux generated on the inductive path causes an induced electromotive force on the pickup coils, and the induced electromotive force generated on the pickup coils is rectified as a predetermined voltage in the rectifier circuit and is supplied to the load. When the load is under normal load conditions, the switching device of the switching unit turned on to connect the switching unit between the junction of the two capacitors, which are connected in series with an equal capacitance between the output ends of the rectifier circuit, and one end of the resonance circuits, resulting in a double voltage circuit, so that a voltage twice as high as the voltage generated in the rectifier circuit is applied to the load. When the load is under light load conditions, the output voltage increases, the switching device of the switching unit is turned off by the voltage control unit to open the circuit between the junction of the two capacitors and one end of the resonance circuits, and the voltage generated in the rectifier circuit is applied as it is to the load.

An invention of claim 5 includes pickup coils which are opposed to a primary-side inductive path for passing a high-frequency current and are fed with an electromotive force induced by the inductive path, resonance circuits including resonance capacitors connected in series with the pickup coils and resonating at the frequency of the inductive path, a booster for boosting a voltage generated by the resonance circuits and feeding the boosted voltage to a load having varying power consumption, a switching unit for switching a connected state and an open state between the resonance circuits and the booster, and a voltage control unit for controlling an output voltage applied to the load, by controlling the switching unit, wherein the booster includes a boosting transformer having a primary-side winding connected in series with the resonance circuits and a first rectifier circuit having an input end connected to the secondary-side winding of the boosting transformer and an output end connected to the load, the switching unit includes a second rectifier circuit having an input end connected to the tertiary winding of the boosting transformer and a switching device connected between the output ends of the second rectifier circuit, and the voltage control unit controls the output voltage applied to the load, by opening and closing the switching device of the switching unit.

According to the configuration, for example, in the case where the pickup coils cannot be wound a desired number of times and just a small induced electromotive force can be generated on the pickup coils, when the load is under normal load conditions, the switching device of the switching unit is turned on, the primary side of the boosting transformer connected in series with the resonance circuits is connected, the voltage generated by the resonance circuit is boosted to a desired voltage by the boosting transformer, and the voltage is supplied to the load. When the load is subjected to light load conditions and the output voltage increases, the voltage control unit turns off the switching device of the switching unit to open the primary side of the boosting transformer, and the output voltage applied to the load is dropped.

An invention of claim 7 includes pickup coils which are opposed to a primary-side inductive path for passing a high-frequency current and are fed with an electromotive force induced by the inductive path, resonance circuits including resonance capacitors connected in series with the pickup coils and resonating at the frequency of the inductive path, a switching unit which is connected in series with the resonance circuits and switches a connect state and an open state between the resonance circuits, a first diode connected across a circuit including the resonance circuits and the switching unit, a second diode having an anode connected to the cathode of the first diode, an output capacitor having one end connected to the anode of the first diode and the other end connected to the cathode of the second diode, a load connected across the output capacitor, and a voltage control unit for controlling an output voltage applied to the load, by controlling the switching unit, wherein the switching unit includes a transformer having a primary-side winding connected in series with the resonance circuits, a rectifier having an input end connected to the secondary-side winding of the transformer, and a switching device connected between the output ends of the rectifier, and the voltage control unit controls the output voltage applied to the load, by opening and closing the switching device of the switching unit.

According to the configuration, when the switching device of the switching unit is turned on to connect the resonance circuits to the output capacitor and the high-frequency current is supplied to the inductive path, a magnetic flux generated on the inductive path causes an induced electromotive force on the pickup coils. The resonance capacitors connected to the pickup coils are charged in the half cycle and the electric charge of the resonance capacitors having been charged in the previous half cycle is added in the subsequent half cycle, the output capacitor is charged, and power is fed to the load. When the load is under normal load conditions, the connected state is kept. When the load is subjected to light load conditions and the output voltage increases and exceeds a predetermined voltage, the voltage control unit turns off the switching device of the switching unit to isolate the resonance circuits from the output capacitor and thus the output capacitor is not charged. In this state, power is fed from the output capacitor to the load, reducing the output voltage. When the output voltage is reduced back to the predetermined voltage, the resonance circuits are connected and the output capacitor is charged again.

According to the secondary-side power receiving circuit of the noncontact power supplying equipment of the present invention, a large current passes through the switching unit when a load is under normal load conditions, and current does not pass through the switching unit under light load conditions, that is, a load current passes through the switching unit according to the state of the load. Thus the loss of the switching unit can be reduced.

BRIEF DESCRIPTION OF THE DRAWINGS

FIG. 1 shows a secondary-side power receiving circuit of noncontact power supplying equipment according to an embodiment of the present invention;

FIG. 2 shows embodiments according to the first basic configuration of the secondary-side power receiving circuit of the noncontact power supplying equipment;

FIG. 4 shows a second basic configuration of the secondary-side power receiving circuit of the noncontact power supplying equipment;

FIG. 7 shows a fourth basic configuration of the secondary-side power receiving circuit of the noncontact power supplying equipment;

DETAILED DESCRIPTION OF THE INVENTION

Best Mode for Carrying Out the Invention

[First Basic Configuration]

The following will describe a secondary-side power receiving circuit of noncontact power supplying equipment according to a first basic configuration of the present invention with reference to the accompanying drawings.

Figure 1A:
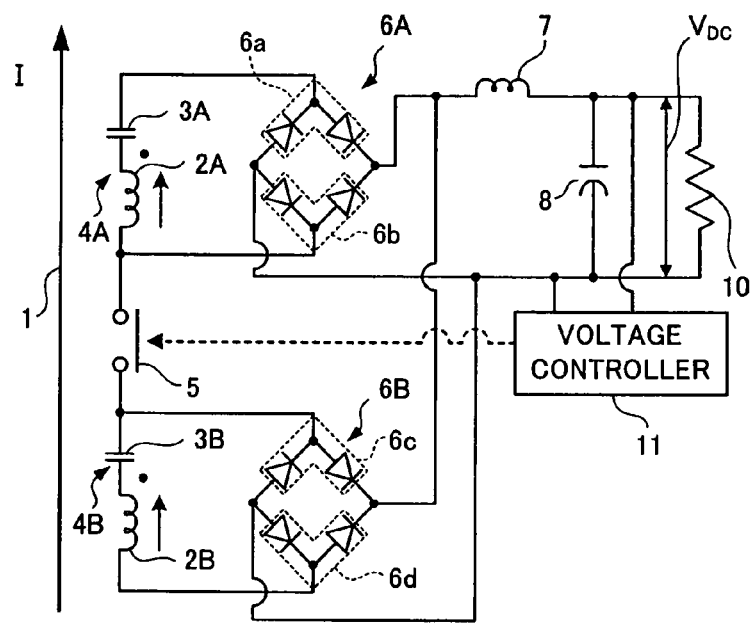
FIG. 1(a) is a circuit diagram of a first basic configuration.

As shown in FIG. 1(a), the secondary-side power receiving circuit of the noncontact power supplying equipment includes a first pickup coil 2A and a second pickup coil 2B which are opposed to a primary-side inductive path 1 for passing, for example, a high-frequency current I of about 10 kHz and are fed with an electromotive force induced by the inductive path 1. The electromotive force induced to the first pickup coil 2A and the second pickup coil 2B is supplied to a load 10 having varying power consumption.

The secondary-side power receiving circuit is made up of a first capacitor (resonance capacitor) 3A and a second capacitor (resonance capacitor) 3B which are respectively connected in series with the pickup coils 2A and 2B and form resonance circuits 4A and 4B resonating at the frequency of the inductive path 1, a switch (an example of a switching unit) 5 which is connected in series between the resonance circuits 4A and 4B and connects or opens the resonance circuits 4A and 4B, rectifier circuits 6A and 6B which are connected in parallel with the resonance circuits 4A and 4B and rectify voltage generated from the resonance circuits 4A and 4B, a current limiting coil 7 connected in series with the output sides of the rectifier circuits 6A and 6B, a voltage capacitor (output capacitor) 8 which is connected in parallel with the output sides of the rectifier circuits 6A and 6B via the coil 7 and is connected to the load 10, and a voltage controller (an example of a voltage control unit) 11 which controls the switch 5 to control an output voltage $V_{DC}$ applied to the load 10, that is, the voltage controller 11 which detects the output voltage $V_{DC}$, turns on the switch 5 when the output voltage $V_{DC}$ is not higher than a predetermined voltage, and turns off the switch 5 when the output voltage $V_{DC}$ exceeds the predetermined voltage.

The rectifier circuit 6A is made up of a first rectifier part 6a which is formed of diodes connected in series, has both ends connected to the load 10, and has an intermediate portion (the junction of the diodes) connected to the first capacitor 3A, and a second rectifier part 6b which is formed of diodes connected in series, has both ends connected to the load 10, and has an intermediate portion (the junction of the diodes) connected to the pickup coil 2A. Similarly, the rectifier circuit 6B is made up of a third rectifier part 6c which has both ends connected to the load 10 and has an intermediate portion connected to the second capacitor 3B, and a second rectifier part 6d which has both ends connected to the load 10 and has an intermediate portion connected to the pickup coil 2B.

The following is the operation of the first basic configuration described above.

For example, when the high-frequency current I of about 10 kHz is supplied to the inductive path 1, a magnetic flux generated on the inductive path 1 causes an induced electromotive force on the pickup coils 2A and 2B, and the induced electromotive force generated on the pickup coils 2A and 2B is rectified as a predetermined voltage in the rectifier circuits 6A and 6B.

When the load 10 consumes a predetermined power under normal load conditions, the output voltage $V_{DC}$ is not higher than the predetermined voltage, the switch 5 is turned on by the voltage controller 11, the resonance circuits 4A and 4B are connected in series, and the sum of the output voltages of the rectifier circuits 6A and 6B is applied to the load 10 (the sum of the output voltages of the rectifier circuits 6A and 6B passes through the coil 7, charges the voltage capacitor 8, and is supplied to the load 10).

In this case, the load 10 decreases and the output voltage $V_{DC}$ increases. When the voltage controller 11 decides that the increased output voltage $V_{DC}$ exceeds the predetermined voltage, the voltage controller 11 turns off the switch 5. When the load 10 is subjected to light load conditions thus and the switch 5 is turned off, the resonance circuit 4A and the resonance circuit 4B are isolated from each other, the rectifier circuit 6A and the rectifier circuit 6B are connected in parallel with each other, and the voltage applied to the load 10 decreases to a half of the sum of the voltages. Thus the output voltage $V_{DC}$ is reduced and kept at the predetermined voltage.

Devices (diodes) used for the second rectifier part 6b and the third rectifier part 6c can have a low current rating as compared with devices (diodes) used for the first rectifier part 6a and the second rectifier part 6d.

As described above, in the first basic configuration, a large current passes through the switch 5 when the load 10 is under normal load conditions, and current does not pass through the switch 5 when the load 10 is under light load conditions. In other words, a load current passes through the switch 5 according to the state of the load 10, thereby reducing the loss of the switch 5.

Figure 1B:
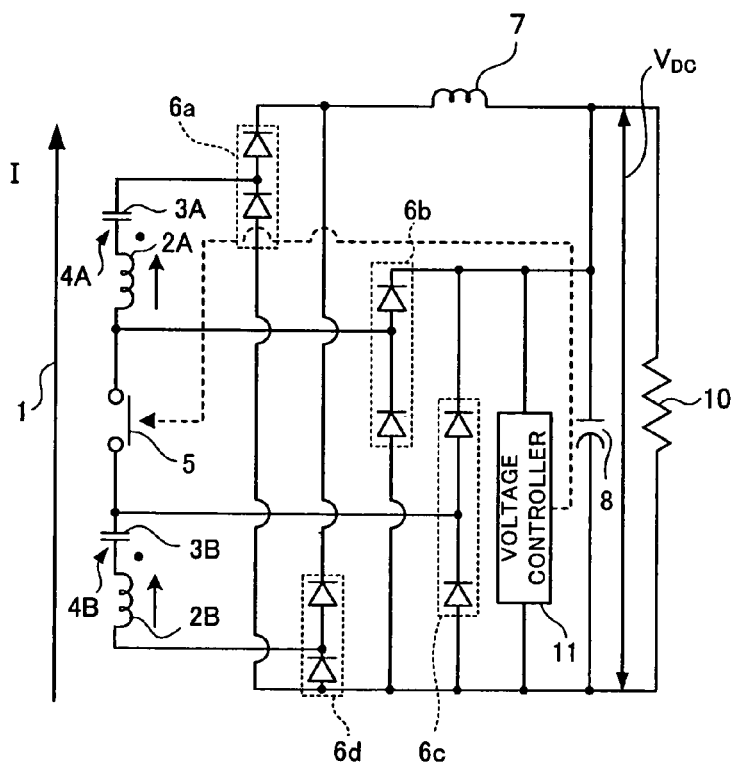
FIG. 1(b) is a circuit diagram showing another mode of the first basic configuration.

The first basic configuration of FIG. 1(a) may be configured as shown in FIG. 1(b).

In the circuit of FIG. 1(b), the current limiting coil 7 is connected in series with the output sides of the rectifier circuits 6A and 6B, the output end of the second rectifier part 6a and the output end of the third rectifier part 6d are connected to the input side of the coil 7, and the output end of the second rectifier part 6b and the output end of the third rectifier part 6c are connected to the output side (load 10) of the coil 7. Other configurations are identical to those of the first basic configuration and thus the explanation thereof is omitted.

The following is the operation of the configuration.

For example, when the high-frequency current I of about 10 kHz is supplied to the inductive path 1, a magnetic flux generated on the inductive path 1 causes an induced electromotive force on the pickup coils 2A and 2B, and the induced electromotive force generated on the pickup coils 2A and 2B is rectified as a predetermined voltage in the first rectifier part 6a and the fourth rectifier part 6d.

When the load 10 consumes a predetermined power under normal load conditions, the output voltage $V_{DC}$ is not higher than the predetermined voltage, the switch 5 is turned on by the voltage controller 11, the resonance circuits 4A and 4B are connected in series, and a voltage rectified by the first rectifier part 6a of the rectifier circuit 6A and the fourth rectifier part 6d of the rectifier circuit 6B is applied to the load 10 (the first rectifier part 6a and the fourth rectifier part 6d are used, that is, the sum of the voltages of the resonance circuits 4A and 4B is rectified and passes through the coil 7, charges the voltage capacitor 8, and is supplied to the load 10).

In this case, the load 10 decreases and the output voltage $V_{DC}$ increases. When the voltage controller 11 decides that the increased output voltage $V_{DC}$ exceeds the predetermined voltage, the voltage controller 11 turns off the switch 5. When the load 10 is subjected to light load conditions and the switch 5 is turned off, the resonance circuit 4A and the resonance circuit 4B are isolated from each other, a voltage rectified by the first rectifier part 6a and the second rectifier part 6b of the rectifier circuit 6A and a voltage rectified by the third rectifier part 6c and the fourth rectifier part 6d of the rectifier circuit 6B are connected in parallel, and the voltage applied to the load 10 decreases to a half of the sum of the voltages. Thus the output voltage $V_{DC}$ is reduced and kept at the predetermined voltage.

When the switch 5 is turned off, the output end of the second rectifier part 6b and the output end of the fourth rectifier part 6d are connected to the output side of the coil 7 described above. Thus current does not pass through the coil 7 from the second rectifier part 6b of the rectifier circuit 6A and the third rectifier part 6c of the rectifier circuit 6B and only a small voltage is applied to the second rectifier part 6b and the third rectifier part 6c as compared with the connection of FIG. 1(a). Hence, in the second rectifier part 6b and the third rectifier part 6c, it is possible to use a device having a smaller voltage rating than the devices (diodes) of the first rectifier part 6a and the fourth rectifier part 6d which are normally fed with current. Further, the first rectifier part 6a and the fourth rectifier part 6d are normally fed with the current of a resonance frequency (the high-frequency current of about 10 kHz) and thus require high-speed devices (diodes). However, since the second rectifier part 6b and the third rectifier part 6c are used only when the switch 5 is turned off, low-speed devices can be used, reducing the manufacturing cost of the secondary-side power receiving circuit.

First Embodiment of First Basic Configuration

A first embodiment illustrates a specific configuration of a switching unit of the first basic configuration and thus the switching unit will be mainly described in the following explanation. The same members as those of the first embodiment will be indicated by the same reference numerals.

Figure 2A:
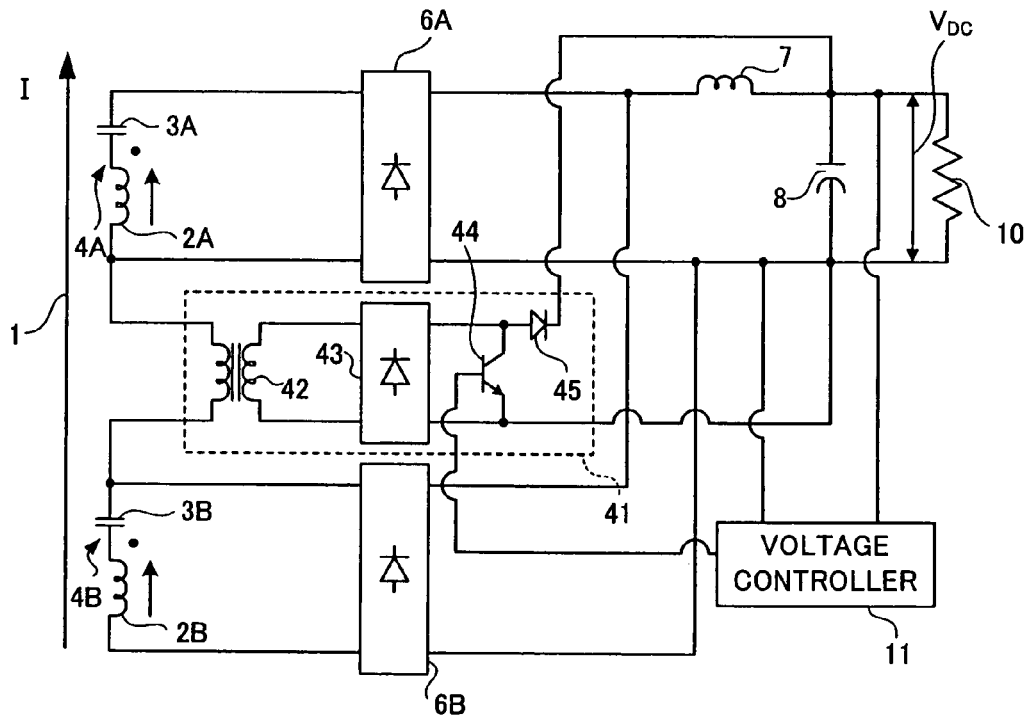
FIG. 2(a) is a circuit diagram of a first embodiment.

As shown in FIG. 2(a), in a secondary-side power receiving circuit of noncontact power supplying equipment according to the first embodiment, a switching unit 41 is connected while insulated between resonance circuits 4A and 4B.

The switching unit 41 is made up of a transformer 42 having a primary-side winging (primary coil) connected in series between the resonance circuits 4A and 4B, a rectifier 43 having an input end connected to both ends of the secondary-side winging (secondary coil) of the transformer 42, an output adjusting transistor (switching device) 44 connected between the output ends of the rectifier 43, to be specific, having a collector and an emitter connected between the output ends of the rectifier 43, and a diode 45 having an anode connected to the junction of the positive-side output end of the rectifier 43 and the collector of the output adjusting transistor 44 and having a cathode connected to one end of a load 10.

A voltage controller 11 detects an output voltage $V_{DC}$. When the output voltage $V_{DC}$ is not higher than a predetermined voltage, the voltage controller 11 turns on the output adjusting transistor 44. When the output voltage $V_{DC}$ exceeds the predetermined voltage, the voltage controller 11 turns off the output adjusting transistor 44.

In the switching unit 41, the turns ratio of the primary-side winding and the secondary-side winding of the transformer 42 is determined by a voltage induced by a pickup coil, the number of resonance circuits, the output voltage $V_{DC}$, and the rating of the output adjusting transistor 44. Generally, the turns ratio of 1:1 is acceptable. However, when the secondary-side winding is opened, the impedance of the primary-side winding has to be sufficiently large as compared with the resistance of the load 10 under light load conditions. When the load 10 is reduced and is subjected to light load conditions, the output adjusting transistor 44 is turned off (opened, will be described later). When a voltage generated by the secondary-side winding of the transformer 42 is smaller than the output voltage $V_{DC}$, current does not pass through the secondary-side winding of the transformer 42. Therefore, the secondary-side winding of the transformer 42 is completely opened and the primary-side winding of the transformer 42 has a high impedance. At this moment, a voltage induced by pickup coils 2A and 2B is applied to the primary-side winding of the transformer 42 having a high impedance, a small current passes through the primary-side winding of the transformer 42, and the current passes through a capacitor 8 and the load 10 through the rectifier 43 on the secondary side. When the resistance (Ω) of the load 10 is lower than the resistance (Ω) of the high-impedance of the primary-side winding in the transformer 42, the discharging current is larger than the charging current and thus the voltage of the capacitor 8 decreases. Since the noncontact power supplying equipment uses high frequencies (for example, 10 kHz), a transformer having desired characteristics with a small number of windings can be achieved by using a material having a high magnetic flux density (Bm) and a high magnetic permeability with no gaps as the magnetic core of the transformer 42.

The following is the operation of the first embodiment according to the first basic configuration described above.

When the load 10 consumes a predetermined power under normal load conditions, the output adjusting transistor 44 is turned on, the secondary-side winding of the transformer 42 is short-circuited, and the resonance circuits 4A and 4B are connected to each other. Thus the resonance circuits 4A and 4B are connected in series.

In this case, the output voltage $V_{DC}$ is not higher than the predetermined voltage, the switch 5 is turned on by the voltage controller 11, and the sum of the output voltages of the rectifier circuits 6A and 6B is applied to the load 10.

In the case where the load 10 decreases and the output voltage $V_{DC}$ increases, when the voltage controller 11 decides that the increased output voltage $V_{DC}$ exceeds the predetermined voltage, the voltage controller 11 turns off the output adjusting transistor 44. When the output adjusting transistor 44 is turned off while the load 10 is under light load conditions, the resonance circuits 4A and 4B are isolated from each other, the rectifier circuit 6A and the rectifier circuit 6B are connected in parallel, and the voltage applied to the load 10 decreases to a half of the sum of the voltages. Thus the output voltage $V_{DC}$ is reduced and kept at the predetermined voltage.

As described above, according to the first embodiment, a large current passes through the output adjusting transistor 44 when the load 10 is under normal load conditions, and current does not pass through the output adjusting transistor 44 when the load 10 is under light load conditions. In other words, a load current passes through the output adjusting transistor 44 according to the state of the load 10, thereby reducing the loss of the output adjusting transistor 44.

Second Embodiment of First Basic Configuration

Figure 2B:
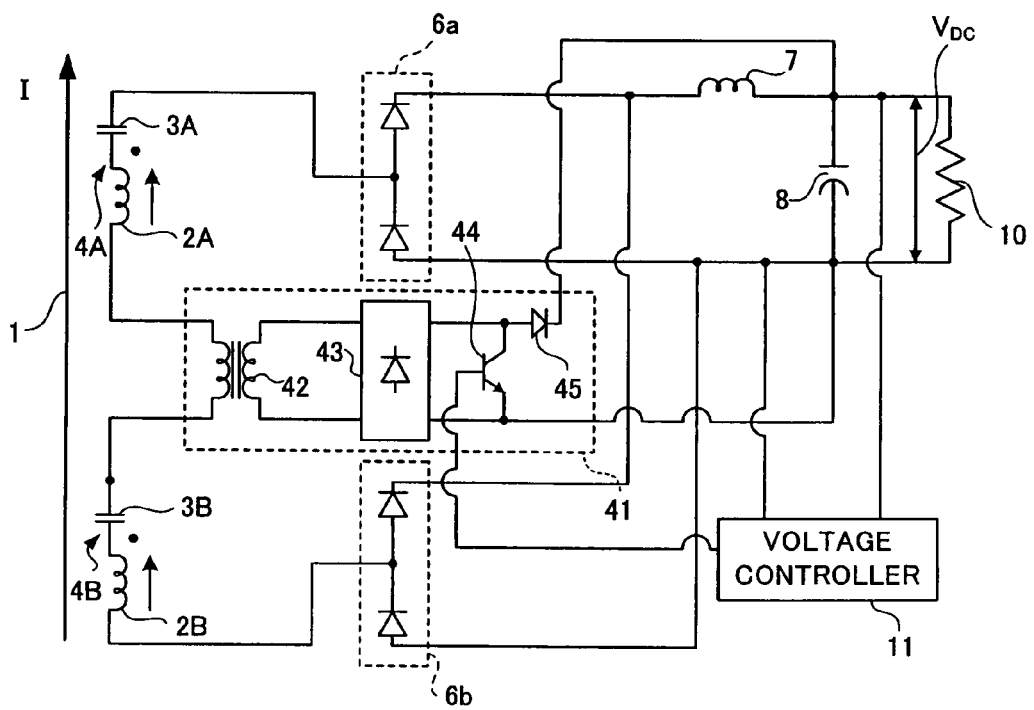
FIG. 2(b) is a circuit diagram of a second embodiment.

The first embodiment of FIG. 2(*a*) according to the first basic configuration may be configured as shown in FIG. 2(*b*).

In the circuit of FIG. 2(*b*), the output end of the second rectifier part (rectifier circuit) 6*a* and the output end of the third rectifier part (rectifier circuit) 6*d* are connected in parallel with an output capacitor 8 and a load 10 via a coil 7, one end of a resonance circuit 4A is connected to an intermediate portion (the junction of two diodes) of the second rectifier part 6*a*, the other end of the resonance circuit 4A is connected to one end of a primary-side winding of a transformer 42, one end of a resonance circuit 4B is connected to the other end of the primary-side winding of the transformer 42, and the other end of the resonance circuit 4B is connected to an intermediate portion (the junction of two diodes) of the third rectifier part 6*d*. Other configurations are identical to those of the first embodiment according to the first basic configuration and thus the explanation thereof is omitted.

The following will describe the operation of the second embodiment according to the first basic configuration.

When the load 10 consumes a predetermined power under normal load conditions, an output adjusting transistor 44 is turned on, the secondary-side winding of the transformer 42 is short-circuited, and the resonance circuits 4A and 4B are connected to each other. Thus the resonance circuits 4A and 4B are connected in series.

In this case, the output voltage $V_{DC}$ is not higher than the predetermined voltage, the switch 5 (the output adjusting transistor 44) is turned on by the voltage controller 11, and the sum of the output voltages of rectifier circuits 6A and 6B is applied to the load 10.

In the case where the load 10 decreases and the output voltage $V_{DC}$ increases, when the voltage controller 11 decides that the increased output voltage $V_{DC}$ exceeds the predetermined voltage, the voltage controller 11 turns off the output adjusting transistor 44. When the output adjusting transistor 44 is turned off while the load 10 is under light load conditions, the impedance of the primary-side winding of the transformer 42 increases and a high-impedance coil appears between the resonance circuits 4A and 4B. At this moment, a current induced to the resonance circuits 4A and 4B only has to pass through the high-impedance coil (the primary-side winding of the transformer 42). A high voltage temporarily occurring on the high-impedance coil is suppressed by passing current to the secondary side through a diode 45, and finally, a current for charging the output capacitor 8 (load 10) from the second rectifier part 6*a* and the third rectifier part 6*d* considerably decreases. Thus the output voltage $V_{DC}$ is reduced and kept at the predetermined voltage.

As described above, according to the second embodiment, the number of diodes used for the rectifier circuit can be halved as compared with the first embodiment, thereby reducing the cost.

Third Embodiment of First Basic Configuration

A third embodiment is a secondary-side power receiving circuit configured such that a resonance circuit 4C formed of a third pickup coil 2C and a third capacitor (resonance capacitor) 3C is further connected in series with the resonance circuits 4A and 4B of the first embodiment and the primary-side winding of a transformer is connected between the resonance circuits 4 (between the resonance circuits 4A and 4B and between the resonance circuits 4B and 4C) while isolated. Thus differences from the first embodiment will be mainly described below. Like the other resonance circuits 4A and 4B, a rectifier circuit 6C for rectifying a voltage generated by the resonance circuit 4C and supplying power to a load 10 having varying power consumption is connected in parallel with the resonance circuit 4C. The same members as those of the first embodiment will be indicated by the same reference numerals in the following explanation.

Figure 3:
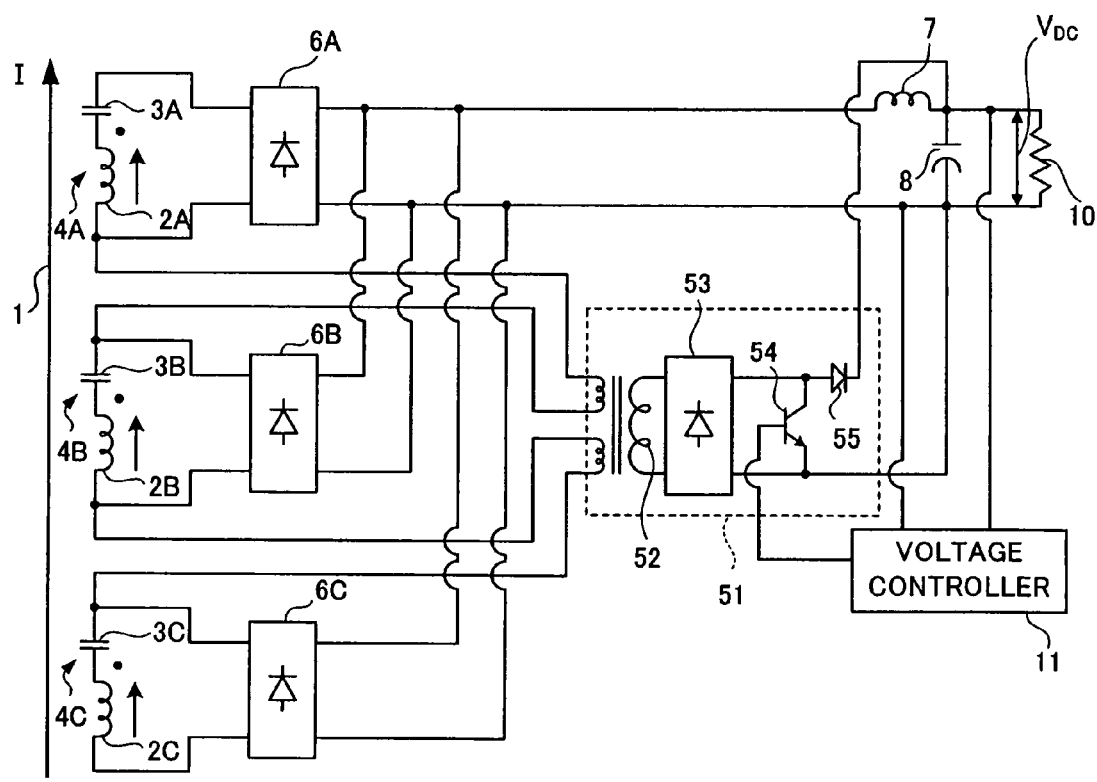
FIG. 3 is a circuit diagram showing a third embodiment according to the first basic configuration of the secondary-side power receiving circuit of the noncontact power supplying equipment.

As shown in FIG. 3, a switching unit 51 is made up of a transformer 52 having a primary-side winding connected in series between the resonance circuits 4A and 4B and between the resonance circuits 4B and 4C, a rectifier 53 having an input end connected to the secondary-side winding of the transformer 52, an output adjusting transistor (switching device) 54 connected between the output ends of the rectifier 53, to be specific, having a collector and an emitter connected between the output ends of the rectifier 53, and a diode 55 having an anode connected to the junction of the positive-side output end of the rectifier 53 and the collector of the output adjusting transistor 54 and having a cathode connected to one end of the load 10.

A voltage controller 11 detects an output voltage $V_{DC}$. When the output voltage $V_{DC}$ is not higher than a predetermined voltage, the voltage controller 11 turns on the output adjusting transistor 54. When the output voltage $V_{DC}$ exceeds the predetermined voltage, the voltage controller 11 turns off the output adjusting transistor 54.

The following is the operation of the third embodiment.

When the load 10 consumes a predetermined power under normal load conditions, the output adjusting transistor 54 is turned on, the secondary-side winding of the transformer 52 is short-circuited, the resonance circuits 4A and 4B are connected to each other, the resonance circuits 4B and 4C are connected to each other, and the sum of the output voltages of the rectifier circuits 6A, 6B and 6C is applied to the load 10.

In this case, the load 10 decreases and the output voltage $V_{DC}$ increases. When the voltage controller 11 decides that the increased output voltage $V_{DC}$ exceeds the predetermined voltage, the voltage controller 11 turns off the output adjusting transistor 54. In this way, when the load 10 is under light load conditions, the output adjusting transistor 54 is turned off and an open state is obtained between the resonance circuits 4A and 4B and between the resonance circuits 4B and 4C. Thus the resonance circuits 4A, 4B and 4C are isolated from one another and the voltage applied to the load 10 decreases to a voltage generated in the resonance circuit 4A (when voltages generated in the resonance circuits 4A, 4B and 4C are equal, the voltage applied to the load 10 decreases to one third of the sum of the voltages). Thus the output voltage $V_{DC}$ is reduced and kept at the predetermined voltage.

As described above, according to the third embodiment, a large current passes through the output adjusting transistor 54 when the load 10 is under normal load conditions, and current does not pass through the output adjusting transistor 54 when the load 10 is under light load conditions. In other words, a load current passes through the output adjusting transistor 54 according to the state of the load 10, thereby reducing the loss of the output adjusting transistor 54.

[Second Basic Configuration]

The following will describe a secondary-side power receiving circuit of noncontact power supplying equipment according to a second basic configuration of the present invention with reference to the accompanying drawings.

Figure 4A:
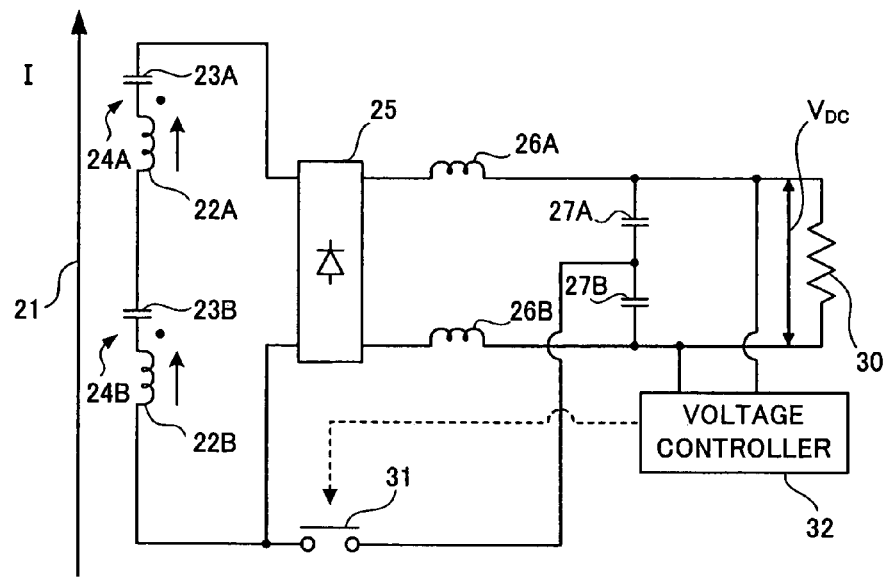
FIG. 4(a) is a circuit diagram.

As shown in FIG. 4(a), the secondary-side power receiving circuit of the noncontact power supplying equipment includes a first pickup coil 22A and a second pickup coil 22B which are opposed to a primary-side inductive path 21 for passing, for example, a high-frequency current I of about 10 kHz and are fed with an electromotive force induced by the inductive path 21. The electromotive force induced to the first pickup coil 22A and the second pickup coil 22B is supplied to a load 30 having varying power consumption.

The secondary-side power receiving circuit is made up of a first capacitor (resonance capacitor) 23A and a second capacitor (resonance capacitor) 23B which are respectively connected in series with the pickup coils 22A and 22B to form resonance circuits 24A and 24B resonating at the frequency of an inductive path 81, a rectifier circuit 25 for rectifying voltages generated by the resonance circuits 24A and 24B connected in series, current limiting coils 26A and 26B connected to the output side of the rectifier circuit 25, capacitors (output capacitors) 27A and 27B which are connected between the output ends of the rectifier circuit 25 through the current limiting coils 26A and 26B and are connected in series with the same capacitance, a switch (an example of a switching unit) 31 for switching a connected state and an open state between the junction of the two capacitors 27A and 27B and one end of the resonance circuits 24A and 24B connected in series, and a voltage controller (an example of a voltage control unit) 32 for controlling the switch 31 to control an output voltage $V_{DC}$ applied to the load 30, to be specific, the voltage controller 32 for detecting the output voltage $V_{DC}$, turning on the switch 31 when the output voltage $V_{DC}$ is not higher than a predetermined voltage, and turning off the switch 31 when the output voltage $V_{DC}$ exceeds the predetermined voltage. The load 30 is connected across the capacitors 27A and 27B connected in series.

The following is the operation of the second basic configuration.

For example, when the high-frequency current I of about 10 kHz is supplied to the inductive path 21, a magnetic flux generated on the inductive path 21 causes an induced electromotive force on the pickup coils 22A and 22B, and the induced electromotive force generated on the pickup coils 22A and 22B is rectified as a predetermined voltage (constant voltage) in the rectifier circuit 25.

When the load 30 consumes a predetermined power under normal load conditions, the output voltage $V_{DC}$ is not higher than the predetermined voltage, the switch 31 is turned on by the voltage controller 32 and is caused to act as a double circuit, so that a voltage twice as high as the voltage generated on the rectifier circuit 25 is applied to the load 30.

In this case, the load 30 decreases and the output voltage $V_{DC}$ increases. When the voltage controller 32 decides that the increased output voltage $V_{DC}$ exceeds the predetermined voltage, the voltage controller 32 turns off the switch 31. When the switch 31 is turned off while the load 30 is under light load conditions, the voltage generated on the rectifier circuit 25 is applied as it is to the load 30 and decreases to a half. Thus the output voltage $V_{DC}$ is reduced and kept at the predetermined voltage.

As described above, in the second basic configuration, a large current passes through the switch 31 when the load 30 is under normal load conditions, and current does not pass through the switch 31 when the load 30 is under light load conditions. In other words, a load current passes through the switch 31 according to the state of the load 30, thereby reducing the loss of the switch 31.

Embodiment of Second Basic Configuration

Figure 4B:
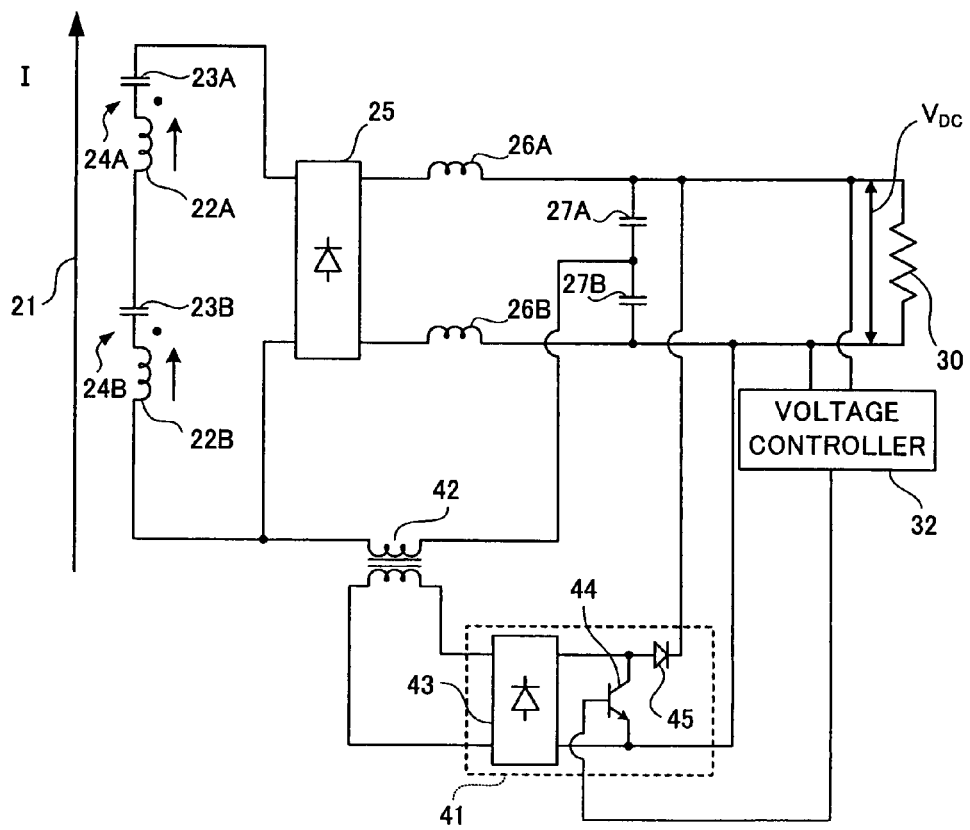
FIG. 4(b) is a circuit diagram showing an embodiment of the second basic configuration.

A first embodiment of FIG. 4(b) shows a specific configuration of a switching unit of the second basic configuration. As the switching unit, the switching unit 41 of the first embodiment of the first basic configuration shown in FIG. 2 is used.

The following is the operation of the second embodiment according to the first basic configuration.

For example, when the high-frequency current I of about 10 kHz is supplied to an inductive path 21, a magnetic flux generated on the inductive path 21 causes an induced electromotive force on pickup coils 22A and 22B, and the induced electromotive force generated on the pickup coils 22A and 22B is rectified as a predetermined voltage (constant voltage) in a rectifier circuit 25.

When a load 30 consumes a predetermined power under normal load conditions, an output voltage $V_{DC}$ is not higher than a predetermined voltage, an output adjusting transistor 44 is turned on by a voltage controller 32, and the output voltage of the rectifier circuit 25 is applied to the load 30.

In this case, the load 30 decreases and the output voltage $V_{DC}$ increases. When the voltage controller 32 decides that the increased output voltage $V_{DC}$ exceeds the predetermined voltage, the voltage controller 32 turns off the switch 31. When the output adjusting transistor 44 is turned off by the voltage controller 32 while the load 30 is under light load conditions, the voltage applied to the load 30 decreases to a half. Thus the output voltage $V_{DC}$ is reduced and kept at the predetermined voltage.

As described above, according to the embodiment, a large current passes through the output adjusting transistor 44 when the load 30 is under normal load conditions, and current does not pass through the output adjusting transistor 44 when the load 10 is under light load conditions. In other words, a load current passes through the output adjusting transistor 44 according to the state of the load 30, thereby reducing the loss of the output adjusting transistor 44.

Although the second basic configuration includes two series resonance circuits 24A and 24B, a single series resonance circuit may be provided instead.

[Third Basic Configuration]

The following will describe a secondary-side power receiving circuit of noncontact power supplying equipment according a third basic configuration of the present invention with reference to the accompanying drawings.

Figure 5:
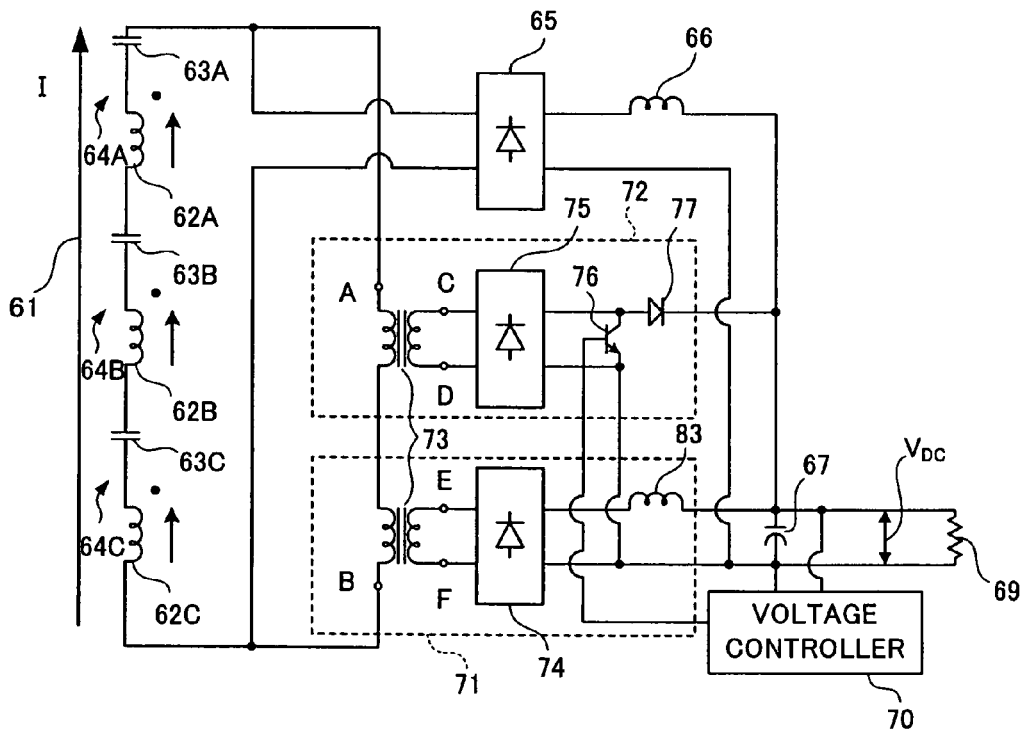
FIG. 5 is a circuit diagram showing a third basic configuration of the secondary-side power receiving circuit of the noncontact power supplying equipment.

As shown in FIG. 5, the secondary-side power receiving circuit of the noncontact power supplying equipment includes a first pickup coil 62A, a second pickup coil 62B, and a third pickup coil 62C which are opposed to a primary-side inductive path 1 for passing, for example, a high-frequency current I of about 10 kHz and are fed with an electromotive force induced by the inductive path 1. The electromotive force induced to the first pickup coil 62A, the second pickup coil 62B, and the third pickup coil 63C is supplied to a load 69 having varying power consumption.

The secondary-side power receiving circuit is made up of a first capacitor (resonance capacitor) 63A, a second capacitor (resonance capacitor) 63B, and a third capacitor (resonance capacitor) 63C which are respectively connected in series with the pickup coils 62A, 62B and 62C and form resonance circuits 64A, 64B and 64C resonating at the frequency of an inductive path 61, a rectifier 65 which is connected in parallel with the resonance circuits 64A, 64B and 64C connected in series and rectifies voltages generated by the resonance circuits 64A, 64B and 64C, a current limiting coil 66 connected in series with the output side of the rectifier 65, a voltage capacitor (output capacitor) 67 which is connected in parallel with the output side of the rectifier 65 via the coil 66 and is connected to the load 69, a voltage controller (an example of a voltage control unit) 70 which controls an output adjusting transistor 76 (will be described later) to control an output voltage $V_{DC}$ applied to the load 69, to be specific, the voltage controller 70 which detects the output voltage $V_{DC}$, turns on the output adjusting transistor 76 when the output voltage $V_{DC}$ is not higher than a predetermined voltage, and turns off the output adjusting transistor 76 when the output voltage $V_{DC}$ exceeds the predetermined voltage, a booster 71 for boosting a voltage generated by the resonance circuits 64A, 64B and 64C connected in series and feeding the boosted voltage to the load 69, and a switching unit 72 for switching a connected state and an open state between the resonance circuits 64A, 64B and 64C connected in series and the booster 71.

Figure 6:
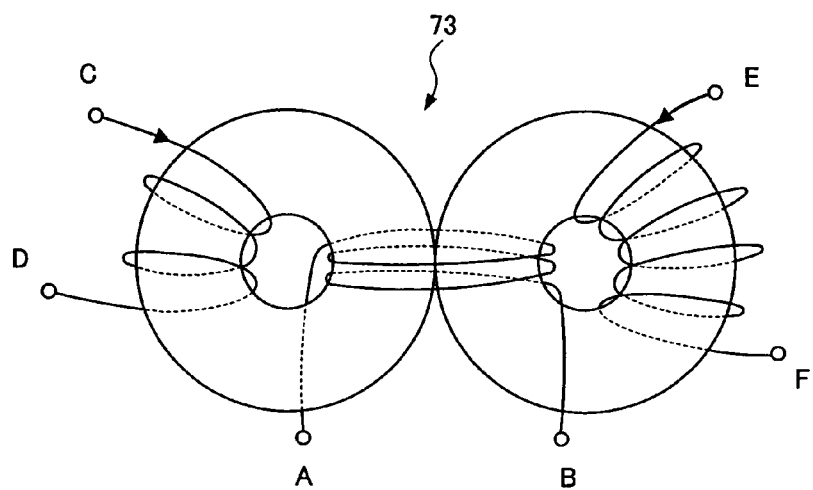
FIG. 6 shows a boosting transformer in the third basic configuration of the secondary-side power receiving circuit of the noncontact power supplying equipment.

As shown in FIGS. 5 and 6, the booster 71 is made up of a boosting transformer 73 having a primary-side winding connected in series with the resonance circuits 64A, 64B and 64C connected in series, a first rectifier circuit 74 having an input end connected to the secondary-side winding of the boosting transformer 73, and a current limiting coil 83 connected in series with the output side of the first rectifier circuit 74 and connected to the voltage capacitor 67. The output end of the first rectifier circuit 74 is connected to the voltage capacitor 67. In the boosting transformer 73, the turns ratio between A and B and between E and F is set according to the magnitude of the voltage applied to the load 69.

The switching unit 72 is made up of a second rectifier circuit 75 having an input end connected to the tertiary winding of the boosting transformer 73, an output adjusting transistor (an example of a switching device) 76 connected between the output ends of the second rectifier circuit 75, and a diode 77 having an anode connected to the junction of the positive-side output end of the second rectifier circuit 75 and the collector of the output adjusting transistor 76 and a cathode connected to one end of the load 69.

The following is the operation of the third basic configuration.

For example, when the pickup coils 62A, 62B and 62C cannot be wound well around the ferrite core of a pickup unit due to a problem of the positional relationship and so on between an inductive path unit and the pickup unit (when the coils cannot be wound a desired number of times), only a small induced electromotive force can be generated on the resonance circuits 64A, 64B and 64C. Thus a voltage generated by the resonance circuits 64A, 64B and 64C is boosted using the booster 71 and the boosted voltage (constant voltage) is rectified by the first rectifier circuit 74 and is fed to the load 69 having varying power consumption. At this moment, the output adjusting transistor 76 is turned on.

To be specific, when the load 69 consumes a predetermined power under normal load conditions, the output adjusting transistor 76 is turned on, the voltage generated on the resonance circuits 64A, 64B and 64C is boosted to a desired voltage by the boosting transformer 73, is rectified by the first rectifier circuit 74, and is supplied to the load 69.

In this case, the load 69 decreases and the output voltage VDC increases. When the voltage controller 70 decides that the increased output voltage VDC exceeds the predetermined voltage, the voltage controller 70 turns off the output adjusting transistor 76 and opens the primary side of the boosting transformer 73 connected in series with the resonance circuits 64A, 64B and 64C connected in series. In this way, the output adjusting transistor 76 is turned off when the load 69 is under light load conditions. Thus no voltage is generated on the secondary side of the boosting transformer 73, and the voltage generated on the resonance circuits 64A, 64B and 64C connected in series is rectified instead as it is by the rectifier 65 and is supplied to the load 69. Thus the output voltage VDC is reduced and kept at the predetermined voltage.

As described above, according to the third basic configuration, current passes through the output adjusting transistor 76 when the load 69 is under normal load conditions, and current does not pass through the output adjusting transistor 76 when the load 69 is under light load conditions. In other words, a load current passes through the output adjusting transistor 76 according to the state of the load 69, thereby reducing the loss of the output adjusting transistor 76.

Although the third basic configuration includes the three series resonance circuits 64A, 64B and 64C, a single series resonance circuit may be provided instead.

[Fourth Basic Configuration]

The following will describe a secondary-side power receiving circuit of noncontact power supplying equipment according a fourth basic configuration of the present invention with reference to the accompanying drawings.

Figure 7A:
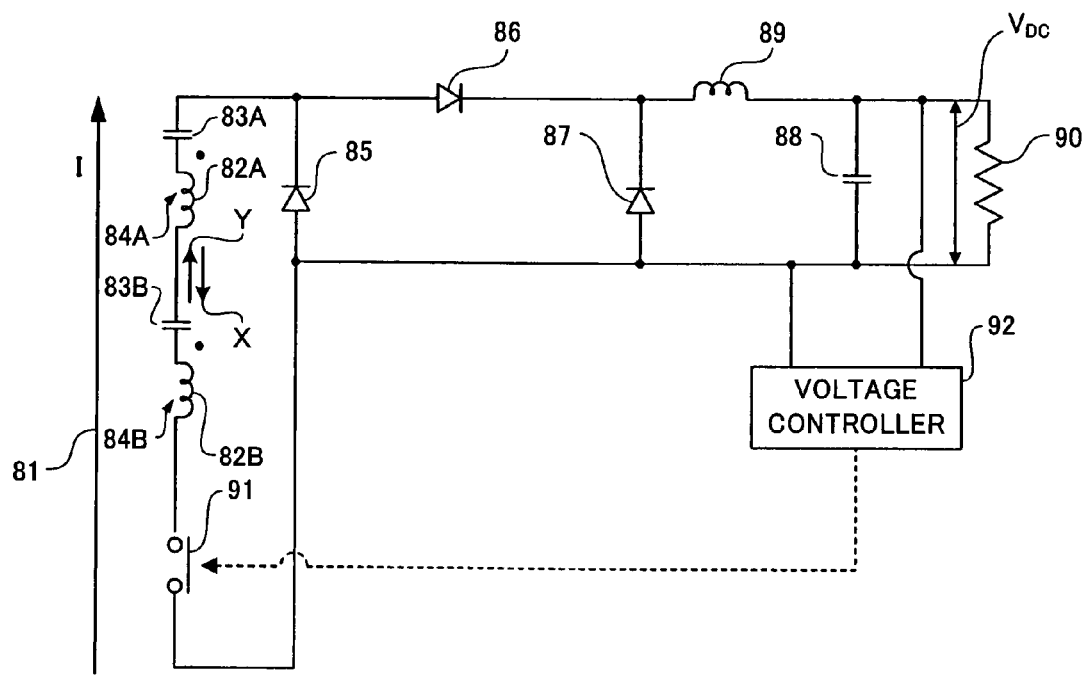
FIG. 7(a) is a circuit diagram.

As shown in FIG. 7(a), the secondary-side power receiving circuit of the noncontact power supplying equipment includes a first pickup coil 82A and a second pickup coil 82B which are opposed to a primary-side inductive path 81 for passing, for example, a high-frequency current I of about 10 kHz and are fed with an electromotive force induced by the inductive path 81. The electromotive force induced to the first pickup coil 82A and the second pickup coil 82B is supplied to a load 90 having varying power consumption.

The secondary-side power receiving circuit is made up of a first capacitor (resonance capacitor) 83A and a second capacitor (resonance capacitor) 83B which are respectively connected in series with the pickup coils 82A and 82B and form resonance circuits 84A and 84B resonating at the frequency of the inductive path 81, a switch (an example of a switching unit) 91 which is connected in series with the resonance circuits 84A and 84B connected in series and connects or opens the resonance circuits 84A and 84B, a first diode 85 connected across a series circuit of the resonance circuits 84A and 84B and the switch 91, a second diode 86 having an anode connected to the cathode of the first diode 85, a third diode 87 having an anode connected to the anode of the first diode 85 and a cathode connected to the cathode of the second diode 86, an output limiting coil 89 having one end connected to the cathode of the second diode 86, a voltage capacitor (output capacitor) 88 having one end connected to the other end of the output limiting coil 89, the other end connected to the anode of the third diode 87, and both ends connected to the load 90, and a voltage controller (an example of a voltage control unit) 92 which controls the switch 91 to control an output voltage VDC applied to the load 90, that is, the voltage controller 92 which detects the output voltage VDC, turns on the switch 91 when the output voltage VDC is not higher than a predetermined voltage, and turns off the switch 91 when the output voltage VDC exceeds the predetermined voltage.

The following is the operation of the fourth basic configuration. In the initial state, the switch 91 is turned on by the voltage controller 92.

For example, when the high-frequency current I of about 10 kHz is supplied to the inductive path 81, a magnetic flux generated on the inductive path 81 causes an induced electromotive force on the pickup coils 82A and 82B.

When the induced electromotive force is generated thus and current flows in the direction of an arrow x in a half cycle, the resonance circuits 84A and 84B and the first diode 85 form a closed loop and the resonance capacitors 83A and 83B are charged. When current flows in the direction of an arrow y in the subsequent half cycle, the electric charge supplied to the resonance capacitors 83A and 83B in the previous half cycle is added by the resonance circuits 84A and 84B, the voltage capacitor 88 is charged through the second diode 86, and the electric charge is fed to the load 90. This operation of each half cycle is repeatedly performed.

When the load 90 consumes a predetermined power under normal load conditions, an output voltage VDC is not higher than a predetermined voltage and the switch 91 is kept turned on by the voltage controller 92.

In this case, the load 90 decreases and the output voltage VDC increases. When the voltage controller 92 decides that the increased output voltage VDC exceeds the predetermined voltage, the voltage controller 92 turns off the switch 91. When the switch 91 is turned off thus while the load 90 is under light load conditions, the resonance circuits 84A and 84B are isolated from the circuit and the capacitor 88 is not charged. When power is supplied from the capacitor 88 to the load 90 in this state, the output voltage VDC is reduced back to the predetermined voltage.

And then, when the output voltage VDC is reduced back to the predetermined voltage or less, the switch 91 is turned on again by the voltage controller 92. The output voltage VDC is controlled to the predetermined voltage by turning on/off the switch 91 thus.

As described above, in the fourth basic configuration, a large current passes through the switch 91 when the load 90 is under normal load conditions, and current does not pass through the switch 91 when the load 90 is under light load conditions. In other words, a load current passes through the switch 91 according to the state of the load 90, thereby reducing the loss of the switch 91.

Further, as compared with the circuit configuration of the second basic configuration (FIG. 4), it is possible to reduce the number of diodes (the number of diodes is four in the rectifier circuit 25 of FIG. 4), eliminate the need for an intermediate tap provided between the capacitors 27A and 27B, and reduce the number of capacitors (output capacitors), achieving higher workability and lower cost.

First Embodiment of Fourth Basic Configuration

Figure 7B:
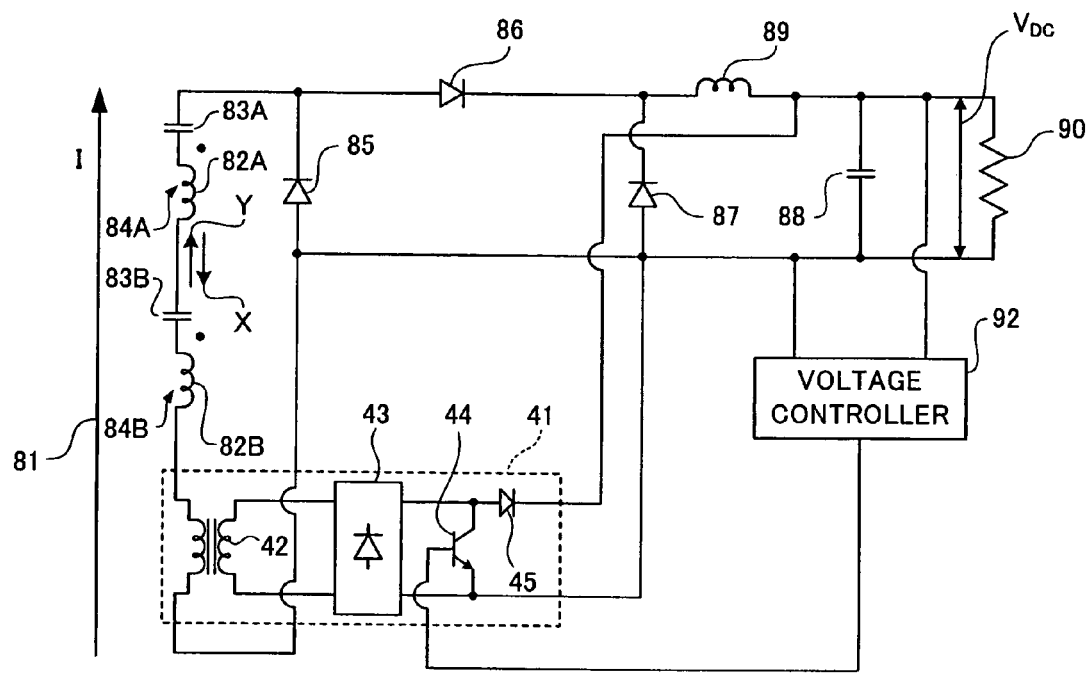
FIG. 7(b) is a circuit diagram of a first embodiment.

A first embodiment of FIG. 7(b) shows a specific configuration of a switching unit of the fourth basic configuration. The switching unit is the switching unit 41 of the first embodiment of the first basic configuration shown in FIG. 2.

The following is the operation of the embodiment of the fourth basic configuration. In the initial state, an output adjusting transistor 44 is turned on by a voltage controller 92 and resonance circuits 84A and 84B are connected to a circuit.

For example, when a high-frequency current I of about 10 kHz is supplied to an inductive path 81, a magnetic flux generated on the inductive path 81 causes an induced electromotive force on pickup coils 82A and 82B.

When current flows in the direction of an arrow x in a half cycle, resonance circuits 84A and 84B and a first diode 85 form a closed loop and resonance capacitors 83A and 83B are charged. When current flows in the direction of an arrow y in the subsequent half cycle, the electric charge supplied to the resonance capacitors 83A and 83B in the previous half cycle is added by the resonance circuits 84A and 84B, the voltage capacitor 88 is charged through a second diode 86, and the electric charge is supplied to a load 90. This operation of each half cycle is repeatedly performed.

When the load 90 consumes a predetermined power under normal load conditions, an output voltage VDC is not higher than a predetermined voltage and the output adjusting transistor 44 is turned on by the voltage controller 92.

In this case, the load 90 decreases and the output voltage VDC increases. When the voltage controller 92 decides that the increased output voltage VDC exceeds the predetermined voltage, the voltage controller 92 turns off the output adjusting transistor 44. When the output adjusting transistor 44 is turned off thus by the voltage controller 92 when the load 90 is under light load conditions, the resonance circuits 84A and 84B are isolated from the circuit and the voltage capacitor 88 is not charged. When the electric power is fed from the capacitor 88 to the load 90 in this state, the output voltage VDC is reduced back to the predetermined voltage.

And then, when the output voltage VDC is reduced back to the predetermined voltage or less, the output adjusting transistor 44 is turned on again by the voltage controller 92. The output voltage VDC is controlled to the predetermined voltage by turning on/off the output adjusting transistor 44 thus.

As described above, according to the first embodiment, a large current passes through the output adjusting transistor 44 when the load 90 is under normal load conditions, and current does not pass through the output adjusting transistor 44 when the load 10 is under light load conditions. In other words, a load current passes through the output adjusting transistor 44 according to the state of the load 90, thereby reducing the loss of the output adjusting transistor 44.

The third diode 87 may not be provided in the circuit of FIG. 7(a) according to the fourth basic configuration and the circuit of FIG. 7(b) according to the first embodiment of the fourth basic configuration.

Second Embodiment of Fourth Basic Configuration

Figure 8:
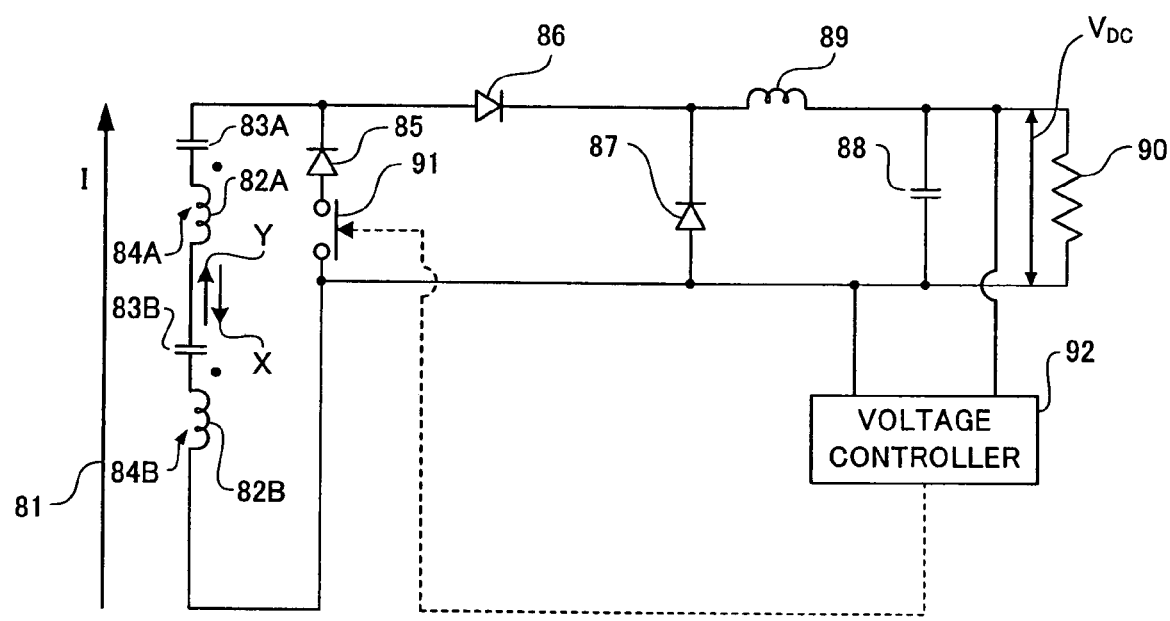
FIG. 8 is a circuit diagram showing a second embodiment of the fourth basic configuration of the secondary-side power receiving circuit of the noncontact power supplying equipment.

In the circuit of the fourth basic configuration shown in FIG. 7(a), the switch 91 is connected in series with the resonance circuits 84A and 84B. As shown in FIG. 8, the switch 91 may be connected in series with the first diode 85. In FIG. 8, the pickup coil 82B of the series resonance circuit 84B is connected to the anode of the third diode 87, and the switch 91 is connected between the junction and the anode of the first diode 85. Instead of the switch 91, the switching unit 41 according to the first embodiment of the first basic configuration may be provided.

The following is the operation of the second embodiment according to the fourth basic configuration. In the initial state, the switch 91 is turned on by the voltage controller 92.

For example, when the high-frequency current I of about 10 kHz is supplied to the inductive path 81, a magnetic flux generated on the inductive path 81 causes an induced electromotive force on the pickup coils 82A and 82B.

When the induced electromotive force is generated thus and current flows in the direction of the arrow x in a half cycle, the resonance circuits 84A and 84B and the first diode 85 form a closed loop and the resonance capacitors 83A and 83B are charged. When current flows in the direction of the arrow y in the subsequent half cycle, the electric charge supplied to the resonance capacitors 83A and 83B in the previous half cycle is added by the resonance circuits 84A and 84B, the voltage capacitor 88 is charged through the second diode 86, and the electric charge is fed to the load 90. This operation of each half cycle is repeatedly performed.

When the load 90 consumes a predetermined power under normal load conditions, the output voltage VDC is not higher than a predetermined voltage and the switch 91 is kept turned on by the voltage controller 92.

In this case, the load 90 decreases and the output voltage VDC increases. When the voltage controller 92 decides that the increased output voltage VDC exceeds the predetermined voltage, the voltage controller 92 turns off the switch 91. When the switch 91 is turned off while the load 90 is under light load conditions, current does not flow in the direction of the arrow x in the half cycle of the generated induced electromotive force, so that the resonance capacitors 83A and 83B are not charged. Even in the direction of the arrow y in the subsequent cycle, the voltage capacitor 88 is not charged. Therefore, the output voltage VDC is reduced back to the predetermined voltage.

And then, when the output voltage VDC is reduced back to the predetermined voltage or less, the switch 91 is turned on again by the voltage controller 92. The output voltage VDC is controlled to the predetermined voltage by turning on/off the switch 91.

As described above, according to the second embodiment, a large current passes through the switch 91 when the load 90 is under normal load conditions, and current does not pass through the switch 91 when the load 90 is under light load conditions. In other words, a load current passes through the switch 91 according to the state of the load 90, thereby reducing the loss of the switch 91.

Although the fourth basic configuration includes two series resonance circuits 84A and 84B, a single series resonance circuit may be provided instead.

In the foregoing basic configurations and embodiments, the secondary-side power receiving circuit includes two or three resonance circuits connected in series. More resonance circuits may be connected in series. By increasing the number of resonance circuits connected in series, it is possible to increase a constant voltage as a constant voltage source.

Although the output limiting coils 7, 26A, 26B, 66, 83 and 89 are provided in the foregoing basic configurations and embodiments, these coils are not always necessary.

The invention claimed is:

1. A secondary-side power receiving circuit of noncontact power supplying equipment, comprising:
   a plurality of pickup coils which are opposed to a primary-side inductive path for passing a high-frequency current and are fed with an electromotive force induced by the inductive path,
   resonance circuits including resonance capacitors respectively connected in series with the pickup coils and resonating at a frequency of the inductive path, the resonance circuits being connected in series,
   the resonance circuits respectively including rectifier circuits rectifying voltages generated by the resonance circuits, the rectifier circuits being connected in parallel to supply power to a load having varying power consumption,
   a switching unit for switching a connected state and an open state between the resonance circuits, and
   a voltage control unit for controlling an output voltage applied to the load, by controlling the switching unit,
   wherein the switching unit includes a transformer having a primary-side winding connected in series between the resonance circuits,
   a rectifier having an input end connected to a secondary-side winding of the transformer, and
   a switching device connected between the output ends of the rectifier, and
   the voltage control unit controls the output voltage applied to the load, by opening and closing the switching device of the switching unit.

2. The secondary-side power receiving circuit of the noncontact power supplying equipment according to claim 1, wherein the primary-side winding and the secondary-side winding of the transformer have a turns ratio of 1:1 and the primary-side winding of the transformer has an impedance higher than a resistance of the load under light load conditions.

3. A secondary-side power receiving circuit of noncontact power supplying equipment, comprising:
   pickup coils which are opposed to a primary-side inductive path for passing a high-frequency current and are fed with an electromotive force induced by the inductive path,
   resonance circuits including resonance capacitors connected in series with the pickup coils and resonating at a frequency of the inductive path,
   a rectifier circuit for rectifying a voltage generated by the resonance circuits and feeding power to a load having varying power consumption,
   two output capacitors connected in series with an equal capacitance and connected between output ends of the rectifier circuit,
   a switching unit for switching a connected state and an open state between a junction of the two output capacitors and one end of the resonance circuits, and
   a voltage control unit for controlling an output voltage applied to the load, by controlling the switching unit,
   wherein the switching unit comprises:
   a transformer having a primary-side winding connected in series between the junction of the two output capacitors and the one end of the resonance circuits,
   a rectifier having an input end connected to a secondary-side winding of the transformer, and
   a switching device connected between output ends of the rectifier, and
   the voltage control unit controls the output voltage applied to the load, by opening and closing the switching device of the switching unit.

4. A secondary-side power receiving circuit of noncontact power supplying equipment, comprising:
   pickup coils which are opposed to a primary-side inductive path for passing a high-frequency current and are fed with an electromotive force induced by the inductive path,
   resonance circuits including resonance capacitors connected in series with the pickup coils and resonating at a frequency of the inductive path,
   a booster for boosting a voltage generated by the resonance circuits and feeding the boosted voltage to a load having varying power consumption,
   a switching unit for switching a connected state and an open state between the resonance circuits and the booster, and a voltage control unit for controlling an output voltage applied to the load, by controlling the switching unit, wherein the booster comprises:

a boosting transformer having a primary-side winding connected in series with The resonance circuits, and a first rectifier circuit having an input end connected to a secondary-side winding of the boosting transformer and an output end connected to the load, the switching unit comprises:

a second rectifier circuit having an input end connected to a tertiary winding of the boosting transformer, and a switching device connected between output ends of the second rectifier circuit, and the voltage control unit controls an output voltage applied to the load, by opening and closing the switching device of the switching unit.

5. A secondary-side power receiving circuit of noncontact power supplying equipment, comprising:

pickup coils which are opposed to a primary-side inductive path for passing a high-frequency current and are fed with an electromotive force induced by the inductive path, resonance circuits including resonance capacitors connected in series with the pickup coils and resonating at a frequency of the inductive path, a switching unit which is connected in series with the resonance circuits and switches a connected state and an open state between the resonance circuits, a first diode connected across a circuit including the resonance circuits and the switching unit, a second diode having an anode connected to a cathode of the first diode, an output capacitor having one end connected to an anode of the first diode and the other end connected to a cathode of the second diode, a load connected across the output capacitor, and a voltage control unit for controlling an output voltage applied to the load, by controlling the switching unit, wherein the switching unit comprises:

a transformer having a primary-side winding connected in series with the resonance circuits, a rectifier having an input end connected to a secondary-side winding of the transformer, and a switching device connected between output ends of the rectifier, and the voltage control unit controls the output voltage applied to the load, by opening and closing the switching device of the switching unit.

* * * * *